April 12, 1966 S. NATELSON ETAL 3,245,152
TRAY LYOPHILIZATION APPARATUS

Filed May 12, 1964 3 Sheets-Sheet 1

SAMUEL NATELSON
HERBERT GOTTFRIED
INVENTORS

BY George B. Oujevolk
ATTORNEY

United States Patent Office 3,245,152
Patented Apr. 12, 1966

3,245,152
TRAY LYOPHILIZATION APPARATUS
Samuel Natelson, 15 Parkwold Drive W., Valley Stream, N.Y., and Herbert Gottfried, 3441 5th Ave., Oceanside, Long Island, N.Y., assignors to Samuel Natelson, Valley Stream, N.Y., and Herbert Gottfried, Oceanside, N.Y.
Filed May 12, 1964, Ser. No. 366,788
9 Claims. (Cl. 34—92)

The present invention relates to lyophilization or freeze drying and more particularly to an apparatus for lyophilization of liquids in trays.

Lyophilization is a process used extensively in clinical chemistry and is the drying in vacuum from the frozen state. Water is removed by sublimation from frozen material and the solute is left as a porous solid. The solute is sealed in vacuo after drying, and retains its biological attributes for long periods. A typical apparatus for carrying out rapid high-vacuum desiccation of frozen suspensions of biologic materials has been described in A. J. Salle, "Fundamental Principles of Bacteriology," 4th Edition, McGraw-Hill 1954. The apparatus described is quite complicated and consists of containers for frozen material to be dried connected to a manifold which conveys the water vapor to a condensing chamber. The instrument is evacuated by means of a suction pump. All the devices of the prior art, are quite elaborate and usually have special vessels to which the material to be treated must be transferred. Thus, with regard to freeze drying in trays, a tray containing a thin layer of liquid is frozen. The tray is then inserted into a vacuum chamber. The chamber is sealed and evacuated. Intermediate between the vacuum pump and the tray chamber is a chamber cooled to a temperature of less than $-50°$ F. Vapor from the ice (if water is the solvent) is condensed in the cooled chamber by molecular distillation and the sample is eventually dried or "lyophilized." In this manner, heat sensitive substances may be preserved.

In the systems used at present, the tray is in a vacuum chamber. This produces the problem of supplying the heat to the sample necessary to maintain the ice just below its freezing point ($+32°$ F.). Otherwise the evaporation rate drops as heat is removed from the ice and the temperature drops. This lowers the vapor pressure to the point where evaporation is very slow requiring long periods of time before lyophilization is complete.

In order to overcome this disadvantage to tray drying, some prefer to evaporate from closed flasks attached to the vacuum line allowing the heat from the atmosphere to supply the energy to the material being evaporated. Since flask drying is inconvenient in many applications tray drying is preferred by many. In order to supply the heat, various methods have been applied. Among these have been the applications of infra red heating or direct electrical heating. With electrical heating the heat must travel from the bottom of the ice to the top where evaporation is taking place. This is an inefficient process since ice is not a good conductor of heat. Further, after evaporation has taken place there is a tendency to overheat the material since one cannot predict the exact time when all the ice is removed. This latter deficiency is also caused with infra red heating.

Some have used heating on the walls of the vacuum chamber allowing some air or inert gas to bleed into the vacuum chamber so that the vacuum is maintained at 300 to 500 microns pressure. This gas is supplied to circulate the heat and thus heat the trays. This also cuts down on the rate of evaporation since higher pressures are being used than customary (about 10–20 microns), partially defeating the purpose of the instrument which is to create a greater vapor pressure difference between the sample and the condensing chamber.

A major disadvantage of present tray freeze driers is the large volume that needs to be evacuated since the trays are bulky. Thus high capacity vacuum pumps are required. The chamber walls need to be very thick to withstand the pressure in such large chambers. The more trays to be used the larger becomes the vacuum chamber. This results in an expensive instrument with heavy walls.

The present invention solves the problems discussed above in an inexpensive manner permitting the evaporation of large numbers of trays contained in a thin walled chamber. It also supplies a controlled amount of heat so that evaporation can take place at any temperature desired which may be maintained constant. It permits the removal of any individual tray at any time without disturbing the other trays which are still evaporating. The instrument does not put any serious limitation on the shape or size of the tray or the material from which it is made except that the tray must be able to withstand the pressure produced on its walls by a vacuum within. Glass, metal and plastic trays may be used. Thus, the present invention provides for a simple apparatus which is useful in the lyophilization of biologic materials, and which can readily accommodate almost any type of vessel which has an open portion of even configuration.

Therefore, the object of the present invention is to provide an instrument useful in freeze drying of liquids in trays which is inexpensive to manufacture, of a simple construction and can be used with common laboratory containers.

With the foregoing and other objects in view, the invention resides in the novel arrangement and combination of parts and in the details of construction hereinafter described and claimed it being understood that changes in the precise embodiment of the invention herein disclosed may be made within the scope of what is claimed without departing from the spirit of the invention.

Other objects and advantages will become apparent from the following description taken in conjunction with the accompanying drawing in which.

Figure 1:
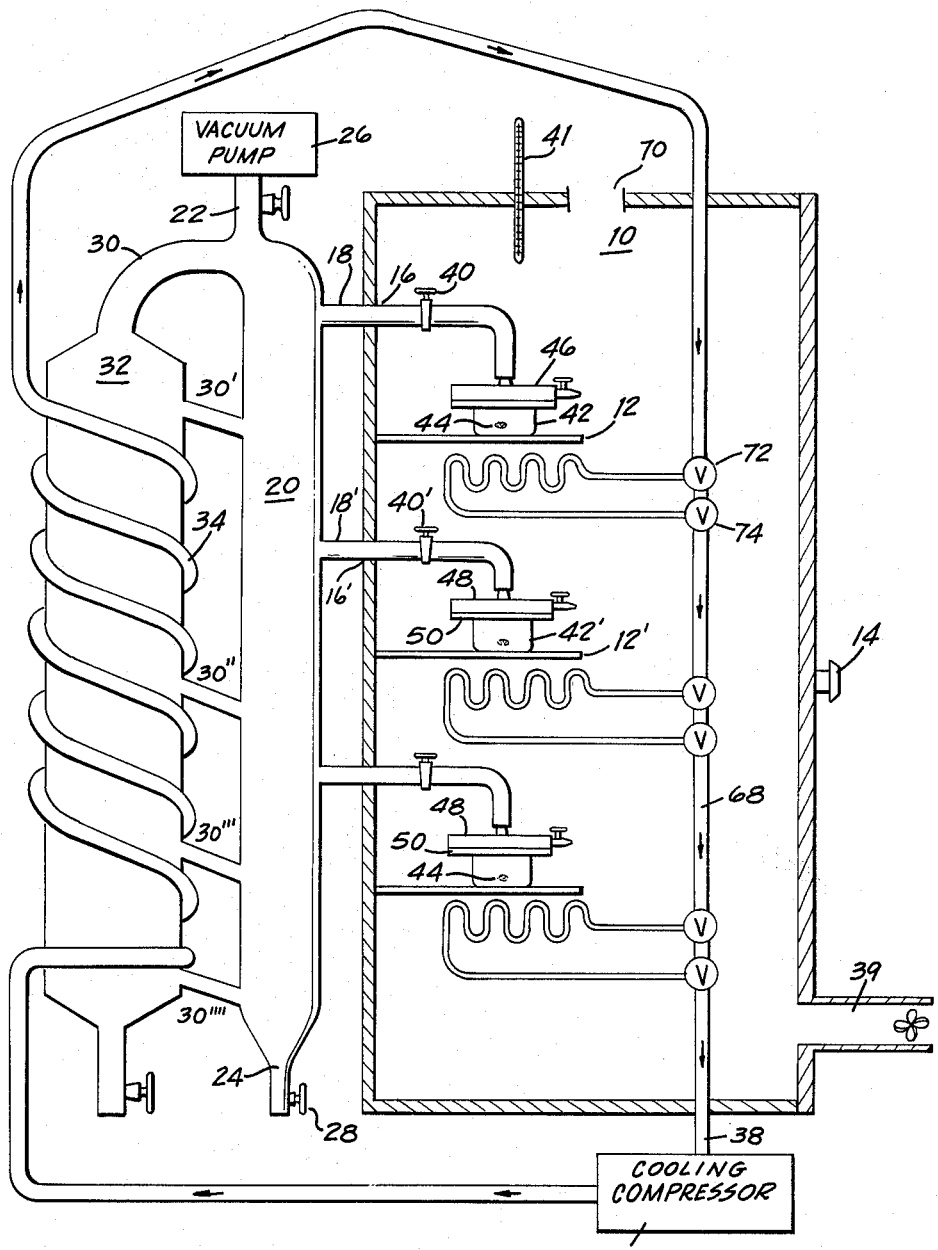
FIGURE 1 is a partly perspective, partly cross-sectional view of a freeze drying arrangement contemplated herein.
Figure 2:
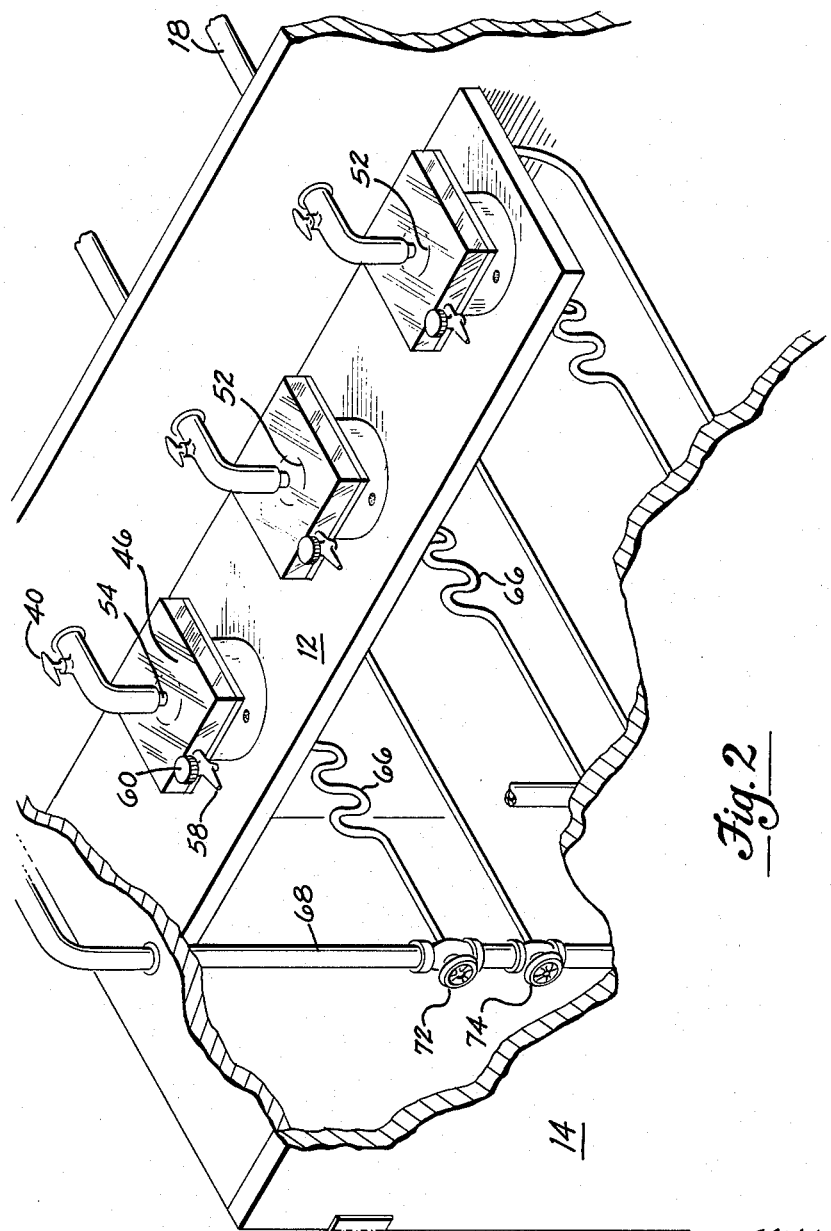
FIGURE 2 shows a perspective view of part of the arrangement shown in FIGURE 1.
Figure 3:
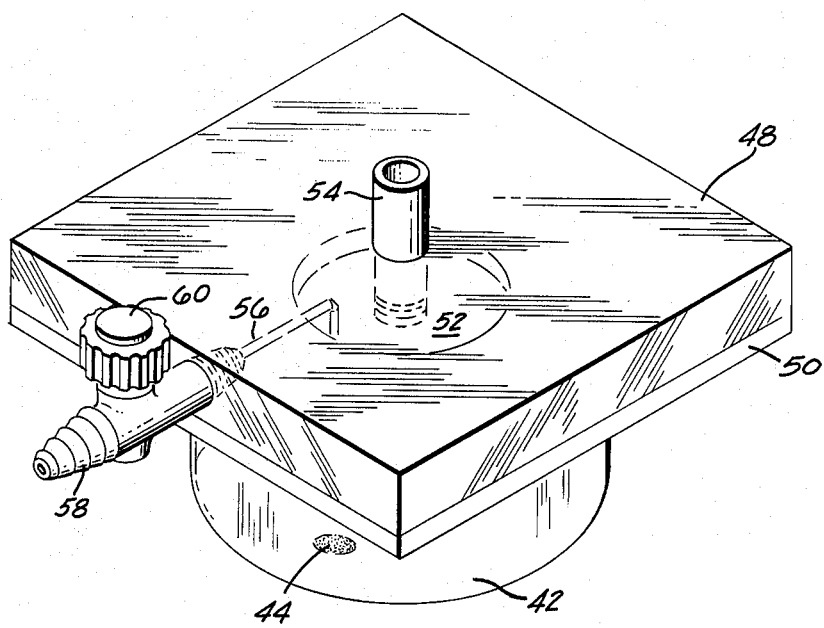
FIGURE 3 illustrates a perspective view of one of the components used in FIGURE 1.

Although the lyophilization arrangements of the prior art required cabinets with very thick walls to maintain a vacuum therein, one of the key features in the present invention is that a thin wall cabinet is used. The lyophilization being accomplished by the combination of a cabinet and a small lyophilization device herein described. Furthermore, the size of the cabinet and its walls does not increase radically with an increase in the number of trays.

Shown in the drawing is a cabinet 10 with a plurality of shelves 12, 12' and a door 14. The cabinet has a plurality of apertures 16, 16' at the rear thereof opposite the door and through each aperture is a suction line 18, 18' leading to a vacuum manifold 20 having upper and lower ports 22, 24. The upper port 22 leads to a vacuum pump 26, the lower port acts as a drain and has a stop cock 28. Communicating with the manifold by lines 30, 30', 30'', 30''' and 30'''', is a cooled chamber 32 having a cooling coil arrangement 34. This multiplicity of connectors 30, 30', etc. decreases the path that the vapor must travel before it reaches the cooling zone. A compressor 36 is connected to cabinet 10 by a line 38 feeding cooling fluid to a cooling section of the cabinet. The cabinet is maintained at atmospheric pressure. There is also a blower 39 to pump air or gas such as nitrogen at a controlled temperature (heater and temperature control are not shown) through the cabinet to supply the heat necessary for the lyophilization at constant temperature. The temperature is read on thermometer 41. Gas in the cabinet leaves by outlet 70. The cooling section of the cabinet consists of tubing running through the cabinet but insulated therefrom, continuing around or through the cooled chamber and finally back to the compressor. The compressor feeds cooling fluid at constant low temperature through this tubing.

Each suction line 18, 18' includes a stop cock 40, 40' and communicates with a vessel 42, 42' having biologic material 44 therein it is desired to freeze dry, in a manner of particular importance to the present invention. Disposed over vessel 42 is cover device 46 which comprises an inert, transparent flat medium 48, e.g., plastic or glass, to one side of which is affixed an inert, rectangular, resilient sealing medium 50, e.g., rubber; the sealing medium being substantially the same size as the solid medium. Centrally disposed in the sealing medium is an aperture 52, and leading from this aperture 52 in the solid medium is an evacution duct 54 which is affixed to the suction line 18 of the pump apparatus. Longitudinally disposed in the solid medium 48 and communicating with evacuation duct 54 as an inlet line 56 having a bleeder inlet 58 and a valve 60.

In order to treat the biologic material 44, lyophilization device 46 is disposed over the vessel 42 so that the sealing medium 50 engages the top thereof. Meanwhile evacuation duct 54 is connected to the suction line 18 and pump 26 is turned on. With the evacuation of the air in vessel 42, the lyophilization apparatus can be lifted and the vessel 42 will cling to the sealing medium 50 because of the outer atmospheric pressure. The vessel and cover device can then be moved about conveniently in the cabinet for freeze drying to take place.

In some cabinets, the shelves 12 in turn rest on inner cooling coils 66 fed by cooling line 68. A plurality of inner by-pass valves are also provided in the cooling system so as to control the action in individual trays. Thus, by turning valves 72 and 74, one way, the cooling liquid acts on the tray, otherwise the tray is by-passed.

In practice, the by-pass valves are turned to freeze the biologic material to the solid state and then turned so that the cooling fluid by-passes the coils under the trays, permitting lyophilization to take place.

*Example I*

The tissue or fluid to be lyophilized is placed in a tray such as a round or rectangular tray with a beaded top or round or rectangular glass dish or a ceramic bowl. Any container may be used which has a smooth even top. The cover device with the sealing medium is placed on top of the tray. The vacuum pump is turned on. The bleeder valve is closed. The cover device will now adhere to the tray because of atmospheric pressure. The evaporation of the water will cause the remaining water to freeze. Air or an inert gas is allowed to circulate around the trays at a temperature ranging from 4° C. to 80° C. depending upon the sensitivity of the material to heat. For most substances a temperature of 25° C. is satisfactory. For enzymes or hormones the lower temperature is used. Where the material desired is stable, higher temperatures may be used. After lyophilization is complete the bleeding valve is opened to release the pressure so that the trays may be removed. If the material is sensitive to oxygen, the circulating atmosphere may still be air. However, when the lyophilization is completed the stopcock leading to the manifold is closed. The air in the ambient cabinet is flushed out with nitrogen. The bleeder or valve is now opened to release the pressure. The material is now covered with nitrogen and may be so stored.

*Example II*

The material to be lyophilized is placed in the trays, located in the cabinet resting on shelves which in turn rest on the cooling coils. The cooling liquid is directed through the inner cooling coils by means of a by-pass valve. When the material is frozen the cover devices are lowered to rest on the cooling coils and the vacuum is applied. The cover devices are now pressed on to the trays by the atmospheric pressure. The by-pass valve is now turned so that the cooling fluid clears the by-pass valve and is directed solely through the cooling coils in the cooling chamber. If ice is being evaporated the cooling chamber is preferably maintained at less than −45° C., and the atmosphere is maintained at 5° C. for heat sensitive materials. For materials not heat sensitive the atmosphere temperature may be raised to as high a temperature as desired depending upon the capacity of the cooling chamber. The vapor must be removed at such a rate as to maintain the water or other solvent in the material in the solid state. Atmospheric temperatures of 60° C. are satisfactory when rapid lypohilization is desired and water is the solvent, and the material to be isolated can withstand that temperature. When the residue is inorganic higher temperatures may be used.

After lyophilization is complete, the stopcock leading to the vacuum chamber is closed and the bleeder valve is opened. This releases the pressure and allows the trays to be removed.

It is to be observed therefore that the present invention provides for an arrangement for lyophilization of a volatile constituent contained in trays without using a thick-walled vacuum chamber. The trays are disposed in a thin-walled cabinet having shelves thereinfor supporting the trays including a gas feed line and outlet for circulating gas in said cabinet at a constant temperature. Adjacent said cabinet is a manifold having suction lines passing into the cabinet and tube means for a suction pump to act on the manifold. Adjacent the manifold is a cooling chamber with outer cooling coils. In the cabinet, cover devices are disposed over the trays. These cover devices are at least partly flat so as to engage the trays or containers and include an upper solid medium, e.g., plastic which may be entirely flat or have a central dome, and a lower at least partly flat resilient sealing medium such as rubber or Tygon. In some cases these cover devices may be made entirely of a semi-resilient material, e.g., hard rubber. There is a central aperture in the cover and an outlet duct sealed thereto for coupling to the suction line. A bleeder line and bleeder valve for allowing in air or inert gas after lyophilization communicates with the cover apparatus aperture either internally or externally although preferably it is disposed in the cover device, i.e., in the plastic solid upper medium. Or, it can be located in the manifold. Advantageously, a stopcock is placed in the outlet duct of the cover device. For some biologic materials it is useful to have inner cooling coils adjacent the shelves of the cabinet.

The inner and outer cooling coils are controlled by valve means which can direct or cut off the flow to the inner cooling coils in the cabinet. The valve means may be either a single valve controlling the entire cabinet or a plurality of valves controlling the flow of cooling fluid under each tray or both.

In the conventional apparatus addition or removal of a single tray requires breaking the vacuum in the large heavy walled, reaction chamber before a new tray may be inserted or removed. This process requires considerable delay for it requires some time before a proper vacuum can be produced in these large chambers. Further, it permits cross contamination from specimen to specimen in the open trays.

An advantage of the present instrument over the conventional tray drier is the fact that individual trays for drying may be added or removed without interfering with the lyophilization going on in the other trays. Each tray is also separately covered and connected to the other trays only through a tube and the manifold. Thus cross contamination does not occur with the instrument of the present invention.

Lastly, in the drawing, the cooled chamber is shown as being separated from the manifold but connected thereto by a plurality of lines, 30, 30' etc. Those skilled in the art will readily appreciate that the manifold and cooled chamber may be slit longitudinally and fused at the slits. On one elongated chamber could be used, only one end portion of which is cooled to act as the cooled chamber, the other portion acting as the manifold.

Although the present invention has been described in connection with preferred embodiments, it is to be understood that modifications and variations may be resorted to without departing from the spirit and scope of the invention as those skilled in the art will readily understand. Such modifications and variations are considered to be within the purview and scope of the invention and the appended claims.

We claim:

1. An apparatus for lyophilization of a volatile constituent contained in trays, comprising in combination;
   a cabinet having shelves therein for supporting said trays including a gas feed line and outlet for circulating gas in said cabinet at a constant temperature, a manifold adjacent said cabinet having at least one suction line passing into the cabinet and tube means for suction pump means to act on said manifold;
   a cooling chamber with cooling coils, communicating with said manifold;
   at least one cover device in said cabinet disposed over said tray made of an inert medium having a lower, at least partly flat resilient, sealing section, an aperture in said cover device and an outlet duct sealed thereto for coupling to said suction line and, a bleeder line, and a bleeder valve communicating with said cover apparatus aperture for differential pressure release.

2. An apparatus as claimed in claim 1 said bleeder line being disposed in said cover apparatus.

3. An apparatus as claimed in claim 1, said bleeder valve being in said manifold.

4. An apparatus as claimed in claim 1 said suction line and outlet duct constituting a suction duct there being a stopcock therein.

5. An apparatus as claimed in claim 1, said cover device having an inert solid upper medium and an at least partially flat resilient sealing medium for its lower section.

6. An apparatus as claimed in claim 4, said cover device upper medium being rigid plastic at least a portion thereof being transparent.

7. An apparatus as claimed in claim 1 said cabinet including at least one set of inner cooling coils therein adjacent of said shelves including valve means to shut off flow of cooling fluid to said inner cooling coils.

8. A device as claimed in claim 7, including valve means to control the flow of cooling fluid to both said outer and inner cooling coils.

9. A device for lyophilization of substances contained in a closed container which closed container can be of a multiplicity of sizes and shapes but having a smooth even rim at its top, comprising in combination, a rigid plate of an inert material having at least a transparent central portion with a lower, flat, resilient, sealing section, of about the same outer dimensions as the rigid plate, the outer edges thereof corresponding approximately to the outer edges of the rigid plate, and sealed thereto said sealing section extending towards the central portion of the rigid plate, said sealing section serving to engage the container, leaving a central viewing aperture to observe the progress of the lyophilization; an outlet duct sealed to said structure and communicating with said central aperture including an outer connecting section for connecting said duct to a vacuum pump; and a bleed inlet and a pressure releasing valve, extending through said structure and communicating with said central aperture to slowly permit gas to enter the apparatus so that when said pressure releasing valve is opened after lyophilization is complete, the inside of the container is brought to ambient atmospheric pressure, releasing the container from the sealing section permitting ready replacement of that container by another container.

References Cited by the Examiner

UNITED STATES PATENTS

| | | | |
|---|---|---|---|
| 2,477,044 | 7/1949 | Carmean | 34—92 |
| 2,480,954 | 9/1949 | Palmer | 34—5 |
| 2,742,709 | 4/1956 | De Woody | 34—92 |
| 2,907,117 | 10/1959 | Parkinson | 34—5 |

WILLIAM J. WYE, *Primary Examiner.*